July 29, 1941.　　　G. S. BOHANNON　　　2,251,184
FILM HOLDER
Filed Feb. 28, 1939
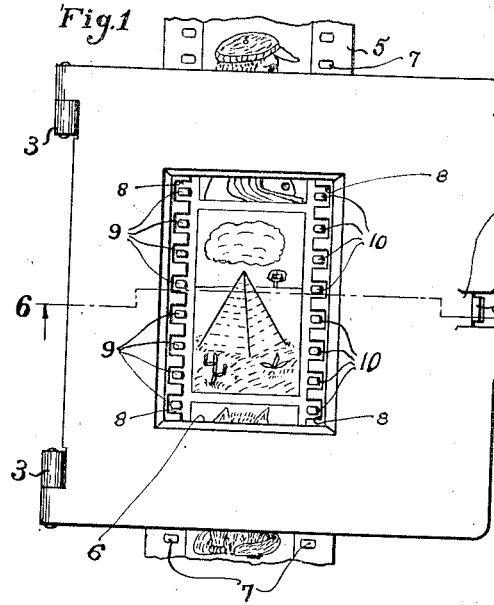
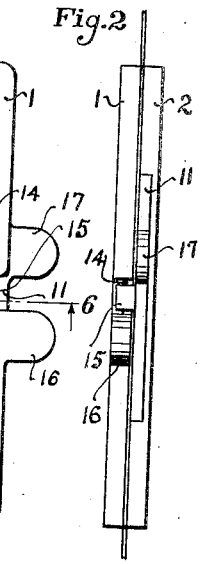
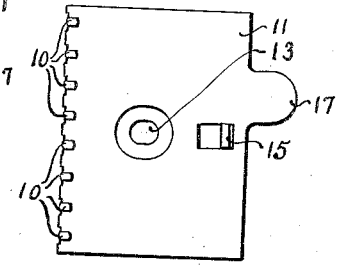
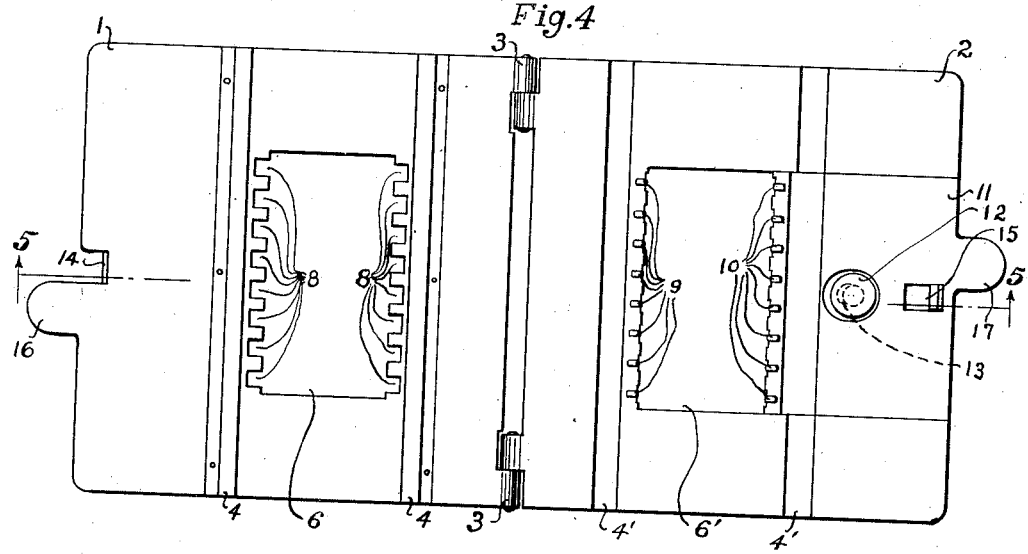
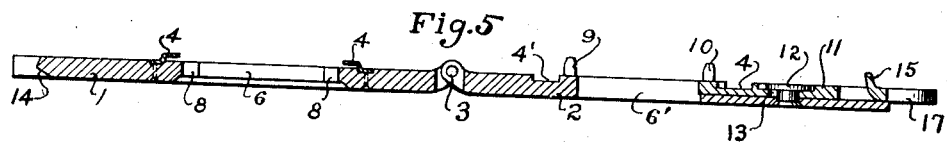
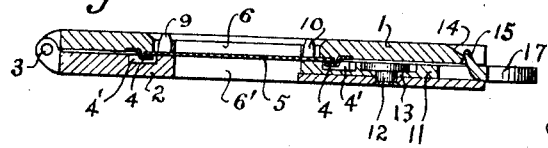
George S. Bohannon
INVENTOR.
BY J. Preston Swecker
his ATTORNEY.

Patented July 29, 1941

2,251,184

UNITED STATES PATENT OFFICE 2,251,184

FILM HOLDER

George S. Bohannon, Fort Worth, Tex.

Application February 28, 1939, Serial No. 259,054

3 Claims. (Cl. 88—24)

This invention relates to improvements in film holders used in making enlargements of a negative or for viewing the transparency of a film or for holding unexposed film during its initial exposure to light.

The object of this invention is to hold the film in a plane relation without the use of glass plates and to improve the manner of holding the film effectively.

The devices heretofore in use for the most part have utilized glass plates between which the films are placed, and due to the heat from the light used in the enlargement or printing, the film is often caused to buckle or otherwise produce distortions due to expansion, and therefore, produce prints of poor quality. Another disadvantage in the use of glass plates is the difficulty or even impossibility of keeping the glass optically clean and free of scratches. Also, when glass is used, certain color interference rings are produced, due to reflection, which result in imperfect prints. Such film holders provided heretofore that have not used glass plates have not provided the improvements of the invention.

The present invention as described herein and disclosed in the accompanying drawing has been designed to correct or overcome, so far as possible, these defects, and furthermore, to present additional advantages in the manner in which the film is disposed within the holder and the ease with which it is manipulated and the ease with which the device operates when used in making prints.

While the drawing illustrates a preferred embodiment of the invention, it is to be understood that the design may be varied and changes made in the minor details of construction to meet specific needs and requirements, within the scope of the invention as claimed without departing from the spirit thereof.

In the drawing:

Fig. 1 is a plan view of the film holder with a strip of perforated film secured therein;

Fig. 2 is an edge view taken at right angles to Fig. 1;

Fig. 3 is a detail plan view of the movable film-engaging member removed from the device;

Fig. 4 is a plan view of the film holder in open position;

Fig. 5 is a section taken on the line 5—5 of Fig. 4 looking in the direction indicated by the arrows; and Fig. 6 is a sectional view taken on the line 6—6 of Fig. 1.

With more particular reference to the drawing, the two sections of the frame are designated by the numerals 1 and 2 and are hinged together at 3 on a side edge thereof. The hinged section 1 carries two film guides 4, between which a strip of film 5 may be inserted and between these guides 4 and the frame section 1. The guides are so spaced as to permit free movement of the film therethrough, until the desired portion of the film comes into register with the openings 6 and 6' in the frame members. The perforations 7 along the edges of the film 5 are brought into register with notches 8 in opposite edges of the opening 6, in position to register with projections 9 and 10 carried by the hinged frame member 2 on opposite sides of the opening 6', when the frame is in closed position. Grooves 4' are formed in frame member 2 so as to receive film guides 4.

The hinged frame member 2 has a movable film engaging member 11 recessed therein and guided thereby, which is held in position by a fastening or rivet 12. The hole 13 within the member 11 may be either slightly larger than the rivet 12 or it may be elongated to accommodate a movement sufficient to stretch the film taut when the device is closed. Upon bringing the hinged members 1 and 2 together until just before they are completely closed, the projections 10 register with the perforations 7 of one side of the film 5.

A sloping edge 14 of member 1 is engaged by a prong 15 on slidable member 11. By closing the hinged members 1 and 2 tightly together, the sloping edge 14 will act against prong 15 in such manner as to slide it outward, and at the same time the projections between the notches 8 will slip the film downward on projections 9 and 10 and clamp it firmly between the members 1 and 2. After the frame is closed the portions 14 and 15 form a latch to hold it in this relation while the film holder is being used for making prints.

After the print of a particular film is obtained, the hinge members may be opened and another picture of the film is moved into register with the opening without the necessity of removing the film from the frame. In this manner prints may be obtained with great rapidity from strip film such as is used in various types of cameras.

Projections 16 and 17 are formed on hinged members 1 and 11, respectively, to form hand holds so as to facilitate the opening and closing of the members 1 and 2.

I claim:

1. A film holder comprising frame members arranged in superposed relation and having registering openings therein adapted to receive a film therebetween, one of said frame members having a transversely extending recess therein on one side of said openings, a film stretching member slidably mounted in said recess for bodily movement transversely relative to said frame member and having means for engaging an edge of the film for stretching the same laterally, holding means for the opposite edge of the film, and means connected with said frame member for limiting the sliding movement of said film adjusting member.

2. A film holder comprising frame members arranged in superposed relation and having registering openings therein adapted to receive a film therebetween, one of said frame members having a transversely extending recess therein on one side of said openings, a film stretching member slidably mounted in said recess for bodily movement transversely relative to said frame member and having means for engaging an edge of the film for stretching the same laterally, holding means for the opposite edge of the film, said adjusting member having a slot therein, and a pin connected with said frame member and extending into the slot for limiting the sliding movement of the adjusting member.

3. A film holder comprising frame members hinged together and having openings therein, projections along a side of said openings for engaging perforations along the side of a film, other projections for engaging the perforations at the opposite side of the film, an adjusting member slidably mounted on one of said frame members and carrying said other projections for moving the same relative to the first-mentioned projections to effect a stretching action on the film, means for guiding said adjusting member transversely of said frame member, and means for holding said film in sliding engagement with the other of said frame members.

GEORGE S. BOHANNON.